(12) United States Patent
Kim

(10) Patent No.: US 7,969,511 B2
(45) Date of Patent: Jun. 28, 2011

(54) METHOD AND APPARATUS FOR IMPROVING QUALITY OF COMPOSITE VIDEO SIGNAL AND METHOD AND APPARATUS FOR DECODING COMPOSITE VIDEO SIGNAL

(75) Inventor: Sung-hee Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1169 days.

(21) Appl. No.: 11/418,366

(22) Filed: May 5, 2006

(65) Prior Publication Data

US 2006/0274210 A1    Dec. 7, 2006

(30) Foreign Application Priority Data

Jun. 4, 2005    (KR) .................... 10-2005-0048115

(51) Int. Cl.
*H04N 5/44* (2006.01)
*H04N 9/78* (2006.01)
*G06K 9/40* (2006.01)

(52) U.S. Cl. ........ 348/625; 348/607; 348/624; 348/663; 348/667; 382/266; 382/275

(58) Field of Classification Search .................. 348/607, 348/624, 625, 663, 666, 667; 382/266, 268, 382/269, 275
See application file for complete search history.

(56) References Cited

U.S. PATENT DOCUMENTS

| | | | |
|---|---|---|---|
| 4,527,188 A | 7/1985 | Lewis, Jr. | |
| 4,851,898 A * | 7/1989 | Asahara | 348/664 |
| 6,008,862 A | 12/1999 | Bellers | |
| 6,157,415 A * | 12/2000 | Glen | 348/599 |
| 6,297,801 B1 * | 10/2001 | Jiang | 345/603 |
| 6,377,313 B1 * | 4/2002 | Yang et al. | 348/630 |
| 6,717,622 B2 * | 4/2004 | Lan | 348/625 |
| 6,774,943 B1 * | 8/2004 | Kao et al. | 348/252 |
| 7,076,113 B2 * | 7/2006 | Le Dinh | 382/261 |
| 7,088,399 B2 * | 8/2006 | Gomi et al. | 348/663 |
| 7,148,924 B2 * | 12/2006 | Hiroshige et al. | 348/252 |
| 7,155,067 B2 * | 12/2006 | Jayant et al. | 382/268 |
| 7,167,595 B2 * | 1/2007 | Hiroshige et al. | 382/266 |
| 7,224,406 B2 * | 5/2007 | Lee et al. | 348/630 |
| 7,310,119 B1 * | 12/2007 | Singh et al. | 348/666 |
| 7,397,515 B2 * | 7/2008 | Walls et al. | 348/624 |
| 7,454,081 B2 * | 11/2008 | Demas et al. | 382/268 |
| 7,532,254 B1 * | 5/2009 | Woodall | 348/609 |
| 7,551,800 B2 * | 6/2009 | Corcoran et al. | 382/275 |
| 7,561,623 B2 * | 7/2009 | Park et al. | 375/240.29 |
| 7,616,240 B2 * | 11/2009 | Hiroshige et al. | 348/252 |
| 7,623,706 B1 * | 11/2009 | Maurer | 382/167 |
| 2002/0006231 A1 * | 1/2002 | Jayant et al. | 382/266 |

(Continued)

FOREIGN PATENT DOCUMENTS

| | | |
|---|---|---|
| EP | 0 358 453 A2 | 3/1990 |
| JP | 2001-095010 A | 4/2001 |
| KR | 1998-023272 A | 7/1998 |
| KR | 1998-0030428 A | 7/1998 |

(Continued)

*Primary Examiner* — Brian Yenke
(74) *Attorney, Agent, or Firm* — Sughrue Mion, PLLC

(57) ABSTRACT

A method and apparatus for improving the quality of a composite video signal and a method and apparatus for decoding the composite video signal. The method for improving the quality of the composite video signal respectively detects edges from a luminance information signal and a chrominance information signal separated from the composite video signal, detects an artifact region using the detected edges, and filters the detected artifact region. Accordingly, an artifact can be effectively removed while preserving edge information and detail information of an image to improve picture quality.

22 Claims, 12 Drawing Sheets

U.S. PATENT DOCUMENTS

| | | | |
|---|---|---|---|
| 2002/0140866 A1* | 10/2002 | Edwards et al. | 348/665 |
| 2003/0035581 A1* | 2/2003 | Islam | 382/199 |
| 2003/0071922 A1* | 4/2003 | Gomi et al. | 348/666 |
| 2004/0155983 A1* | 8/2004 | Topper | 348/624 |
| 2005/0168650 A1* | 8/2005 | Walls et al. | 348/666 |
| 2006/0176405 A1* | 8/2006 | Chen | 348/638 |
| 2006/0251322 A1* | 11/2006 | Palum et al. | 382/167 |
| 2007/0013815 A1* | 1/2007 | MacInnis | 348/624 |

FOREIGN PATENT DOCUMENTS

| | | |
|---|---|---|
| KR | 10-2001-0084015 A | 9/2001 |
| KR | 10-2003-0082194 A | 10/2003 |

\* cited by examiner

METHOD AND APPARATUS FOR IMPROVING QUALITY OF COMPOSITE VIDEO SIGNAL AND METHOD AND APPARATUS FOR DECODING COMPOSITE VIDEO SIGNAL

CROSS-REFERENCE TO RELATED PATENT APPLICATION

This application claims the benefit of Korean Patent Application No. 10-2005-0048115, filed on Jun. 4, 2005, in the Korean Intellectual Property Office, the disclosure of which is incorporated herein in its entirety by reference.

BACKGROUND OF THE INVENTION

1. Field of the Invention

Methods and apparatuses consistent with the present invention relate to removing artifacts generated when a luminance signal and a chrominance signal are extracted from a composite video signal to improve picture quality and decoding the composite video signal.

2. Description of the Related Art

In general, a color TV video signal includes a luminance component and a chrominance component modulated within a restricted bandwidth. The luminance and chrominance components are separated from each other using a comb filter and decoded to be restored to the image corresponding to the color TV video signal. Artifacts caused by interference between the luminance and chrominance components can degrade the video signal depending on the performance of the comb filter. Accordingly, a variety of comb filtering techniques have been studied and developed for NTSC or PAL color decoding for past years in order to improve picture quality.

A conventional NTSC composite video signal encoder and decoder are will now be roughly explained.

FIG. 1 is a block diagram of the conventional NTSC composite video signal encoder. Referring to FIG. 1, R, G and B signals input to a color space converter 101 are converted into Y, I and Q signals. The Y signal passes through a low pass filter 102 having a passband of 0 through 4.2 MHz to be output as a luminance component. The I signal passes through a low pass filter 103 having a passband of 0 through 1.5 MHz and the Q signal passes through a low pass filter 104 having a passband of 0 through 0.5 MHz. Multipliers 105 and 107 respectively multiply the I and Q signals by phases having a difference of 90° between them to modulate the I and Q signals and output the I and Q signals to a summer 109. The summer 109 sums up the signals input thereto. The summed signal passes through a band pass filter 110 and is output to a summer 111 as a chrominance component. The summer 111 sums up the luminance component and the chrominance component to output a composite video signal CVBS.

FIG. 2 is a block diagram of the conventional NTSC composite video signal decoder. Referring to FIG. 2, the composite video signal decoder includes a comb filter 201 that can be used as a Y/C separation filter, a gate 202, a phase compensator 203, a voltage-controlled oscillator 204, a voltage source 205, a summer 206, a multiplier 207, a multiplier 208, a low pass filter 209, and a low pass filter 210.

The comb filter 201 filters a received composite video signal to output a luminance signal Y(t). The summer 206 subtracts the composite video signal from the signal filtered by the comb filter 201 and outputs the resultant signal to the multipliers 207 and 208. The multipliers 207 and 208 multiply the signals input thereto by a phase provided by the voltage source 105 and a phase having a difference of 90° from the phase to demodulate the input signals and output the demodulated signals to the low pass filters 209 and 210, respectively. Here, the voltage source 205 has a color sub-carrier frequency and the decoder demodulates chrominance signals using the color sub-carrier frequency. The low pass filter 209 passes the signal output from the multiplier 207 through a band of 0 through 1.5 MHz to output a chrominance signal I(t). The low pass filter 210 passes the signal output from the multiplier 208 through a band of 0 through 0.5 MHz to output a chrominance signal Q(t).

As described above, comb filtering separates the luminance signal and QAM-modulated chrominance signals from the composite video signal. However, crosstalk between the luminance signal and the chrominance signals generates an undesirable image artifact that is not included in the original signal when the composite video signal is transmitted using frequency interleaving. Thus, it is difficult to satisfactorily extract the luminance signal and the chrominance signals from the composite video signal. Though a technique of interleaving the frequencies of the luminance and chrominance signals restores the original signal using a comb filter theoretically, it is difficult to actually utilize the frequency interleaving technique because of spectral overlapping. Interference of the luminance and chrominance signals of the composite video signal, generated when the luminance and chrominance signals are extracted from the composite video signal, causes artifacts to appear in the image corresponding to the video signal. That is, there is a phase difference between two neighboring vertical lines of the chrominance signal in the NTSC video format. When an image is sampled along one vertical line, the phase difference between the vertical lines is changed and "dot crawl" pattern appears along the edge of a vertical line having color transition at the position where the phase difference is changed. This deteriorates picture quality.

SUMMARY OF THE INVENTION

The present invention provides a method and apparatus for removing an artifact caused by interference between luminance and chrominance signals of an input composite video signal, generated when the luminance and chrominance signals are extracted from the composite video signal, to improve picture quality and a method and apparatus for decoding the composite video signal.

According to an aspect of the present invention, there is provided a method for improving the quality of a composite video signal including: respectively detecting edges from a luminance information signal and a chrominance information signal separated from the composite video signal; detecting an artifact region using the detected edges; and filtering the detected artifact region.

In an exemplary embodiment, the detecting the edges includes restoring a predetermined band of the luminance information signal, and detecting the edge from the band-restored luminance information signal.

In an exemplary embodiment, the restoring the band of the luminance information signal includes increasing or decreasing the predetermined band of the luminance information signal using a band stop filter.

In an exemplary embodiment, the detecting the edges includes detecting the edges using a mask method or a wavelet method.

In an exemplary embodiment, the detecting the artifact region includes determining the artifact region according to $$(Edge_y \cup Edge_q) - (Edge_y \cap Edge_i) - (Edge_y \cap Edge_q)$$

where $Edge_y$ represents the edge of the luminance information signal, $Edge_i$ represents the edge of a first chrominance information signal, and $Edge_q$ denotes the edge of a second chrominance signal.

In an exemplary embodiment, the filtering the detected artifact region includes passing the artifact region through a nonlinear bilateral filter.

According to another aspect of the present invention, there is provided an apparatus for improving the quality of a composite video signal including an edge detecting unit, an artifact region detecting unit, and a filtering unit. The edge detecting unit respectively detects edges from a luminance signal and a chrominance signal separated from the composite video signal. The artifact region detecting unit detects an artifact region using the detected edges. The filtering unit filters the detected artifact region.

According to another aspect of the present invention, there is provided a method for decoding a composite video signal including: separating an input composite video signal into a luminance information signal and a chrominance information signal; respectively detecting edges from the separated luminance information signal and chrominance information signal; detecting an artifact region using the detected edges; filtering the detected artifact region; and converting the filtered luminance information signal and chrominance information into an RGB color space.

In an exemplary embodiment, the separating the composite video signal includes separating the composite video signal into the luminance information signal and chrominance information signal using a comb filter.

In an exemplary embodiment, the detecting the edges includes restoring a band removed by the comb filter from the luminance information that has passed through the comb filter and detecting the edge of the restored luminance information signal, detecting the edge of a first chrominance information signal, and detecting the edge of a second chrominance information signal.

In an exemplary embodiment, the detecting the artifact region includes setting a region according to $(Edge_i \cup Edge_q) - (Edge_y \cap Edge_i) - (Edge_y \cap Edge_q)$ as an artifact region determination map where $Edge_y$ represents the edge of the luminance information signal, $Edge_i$ represents the edge of a first chrominance information signal, and $Edge_q$ denotes the edge of a second chrominance signal.

In an exemplary embodiment, filtering the artifact region includes passing the region defined by the artifact region determination map through a nonlinear bilateral filter.

According to another aspect of the present invention, there is provided an apparatus for decoding a composite video signal including a luminance/chrominance signal separating unit, an edge detecting unit, an artifact region detecting unit, a filtering unit, and a color space converting unit. The luminance/chrominance signal separating unit separates an input composite video signal into a luminance information signal and a chrominance information signal. The edge detecting unit respectively detects edges from the separated luminance information signal and chrominance information signal. The artifact region detecting unit detects an artifact region using the detected edges. The filtering unit filters the detected artifact region. The color space converting unit converts the filtered luminance information signal and chrominance information signal into an RGB color space.

BRIEF DESCRIPTION OF THE DRAWINGS

The above and other features and aspects of the present invention will become more apparent by describing in detail exemplary embodiments thereof with reference to the attached drawings in which.

DETAILED DESCRIPTION OF THE INVENTION

Figure 1:
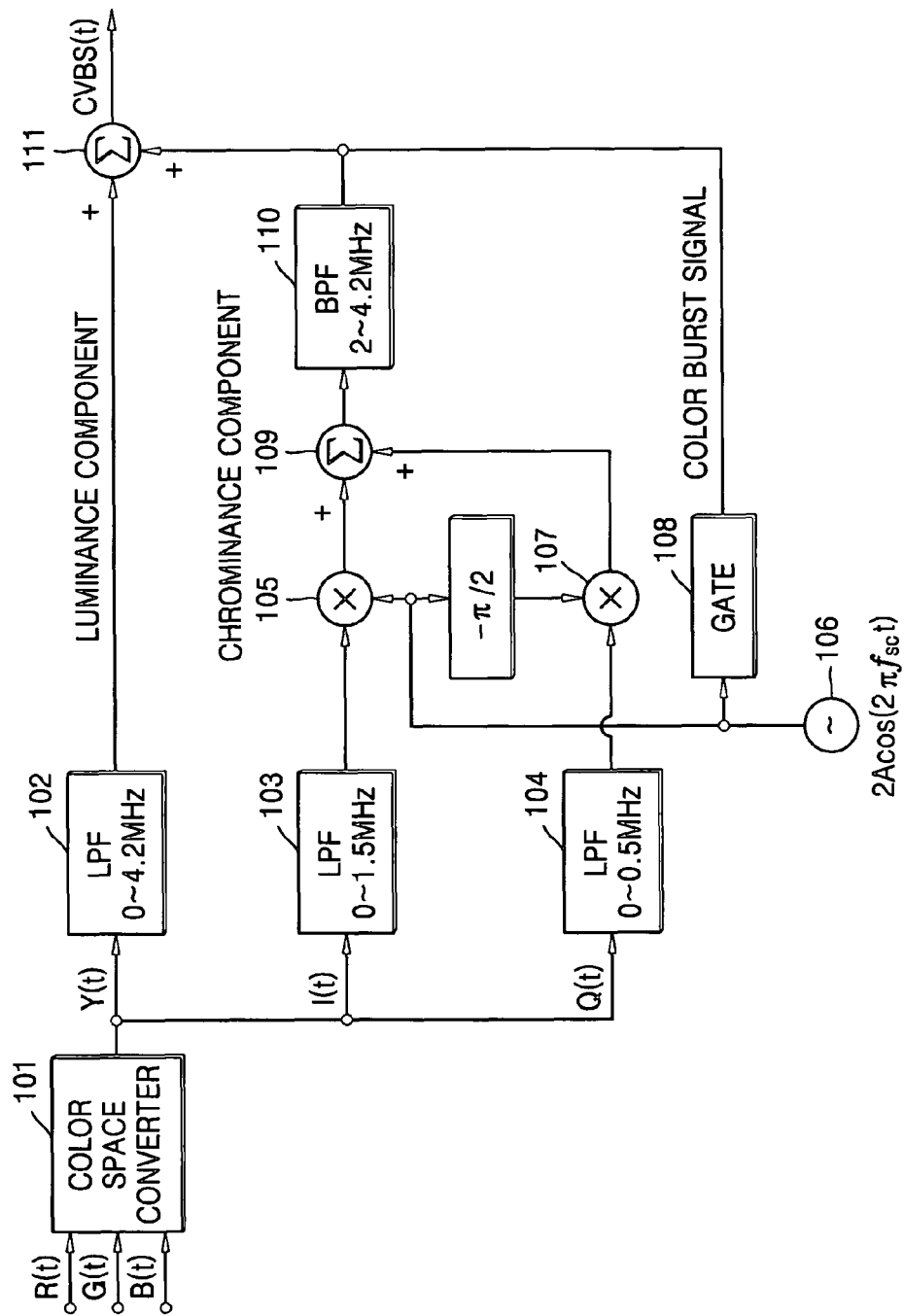
FIG. 1 is a block diagram of a conventional NTSC composite video signal encoder.
Figure 2:
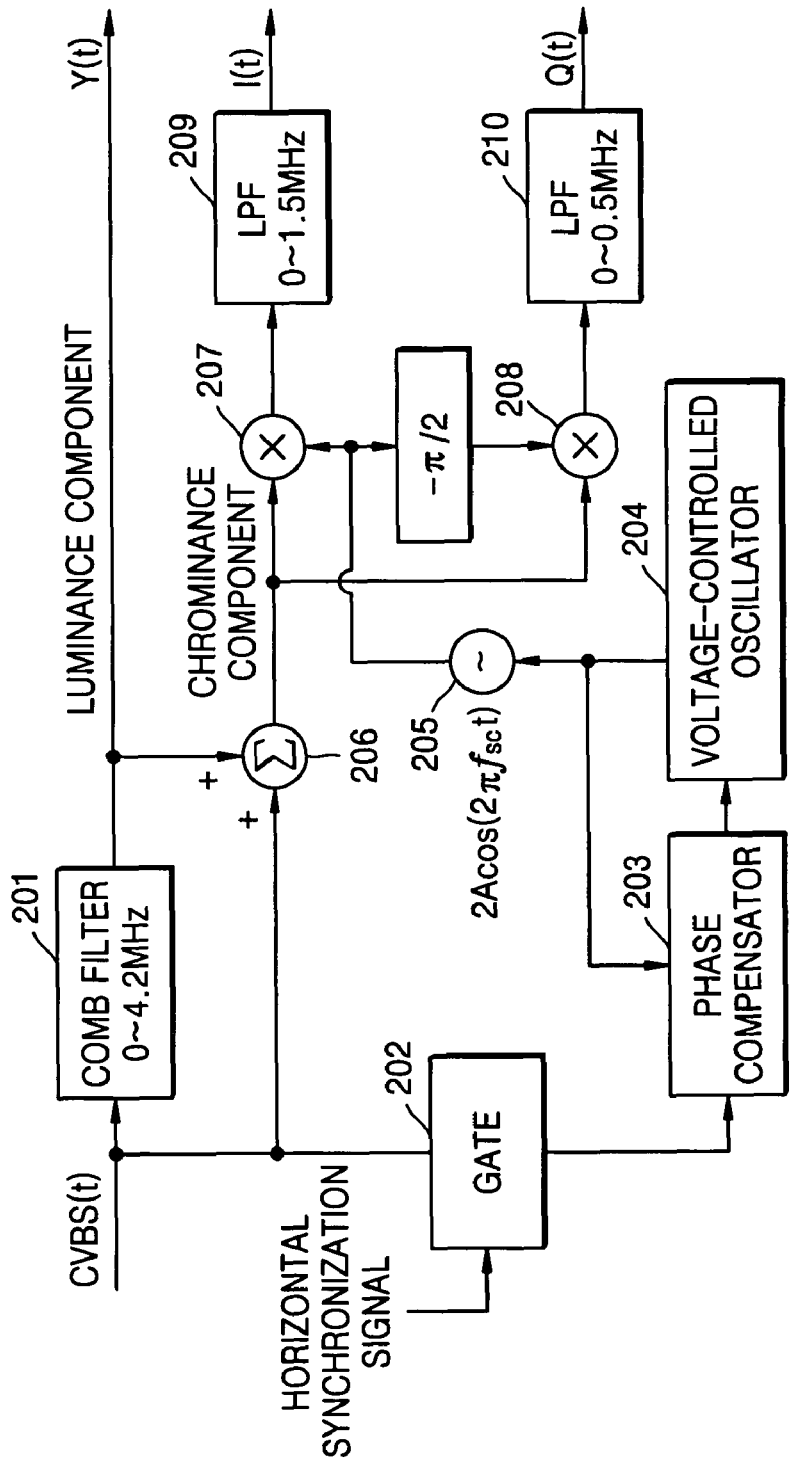
FIG. 2 is a block diagram of a conventional NTSC composite video signal decoder.

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. Throughout the drawings, like reference numerals refer to like elements.

Figure 3:
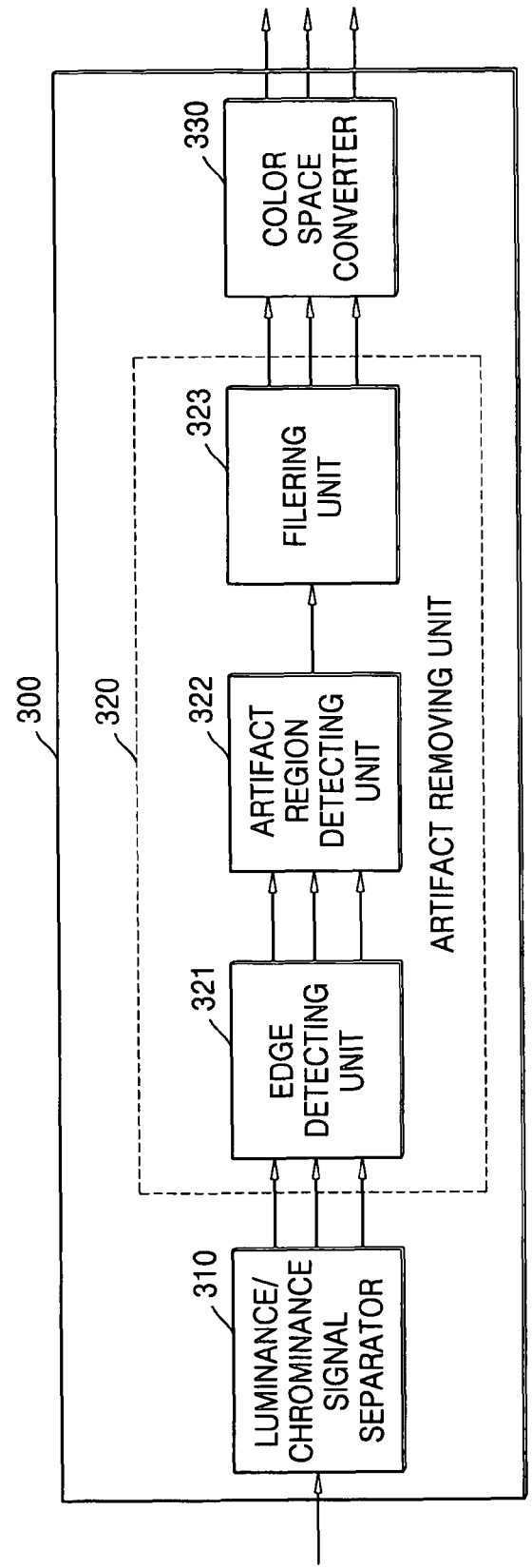
FIG. 3 is a block diagram of a composite video signal decoder capable of removing an artifact according to the present invention.

FIG. 3 is a block diagram of a composite video signal decoder 300 capable of removing an artifact according to the present invention. Referring to FIG. 3, the composite video signal decoder 300 includes a luminance/chrominance signal separator 310, an artifact removing unit 320 and a color space converter 330.

The luminance/chrominance signal separator 310 separates a luminance signal and a chrominance signal from an input composite video signal. The luminance signal and the chrominance signal can be YIQ model used in the NTSC mode, that is, one luminance signal Y and two chrominance signals I and Q or YUV model used in the PAL or SECAM mode, that is, one luminance signal Y and two color difference signals U and V. That is, the method for improving picture quality according to the present invention can be applied to both the YIQ model and the YUV model.

The artifact removing unit 320 includes components for improving picture quality. Specifically, the artifact removing unit 320 includes an edge detecting unit 321, an artifact region detecting unit 322 and a filtering unit 323. The edge detecting unit 321 receives the luminance signal and the chrominance signals output from the luminance/chrominance signal separator 310 and detects edges of the luminance signal and the chrominance signals. That is, the edge detecting unit 310 respectively detects the edges of the luminance signal Y, a first chrominance signal I or U and a second chrominance signal Q or V. An edge is a portion of an image where pixel brightness is changed from a low value to a high value or from a high value to a low value and corresponds to the boundary of a region or the contour of an object in the image. The edge corresponds to a high frequency region of a frequency domain and has information of a detail part. A method of detecting pixels corresponding to the edge is edge detection. There have been proposed a variety of edge detection methods including methods using Prewitt mask method, Robert mask, Sobel mask and Canny mask and a method using wavelet, that is, a filter bank. The edge detecting unit 321 of the present invention can use these methods.

It is preferable, but not necessary, to restore the band of the luminance signal before the edge of the luminance signal is detected. Specifically, a predetermined bandwidth of the luminance signal can be removed when the luminance/chrominance signal separator separates the luminance and chrominance signals from the composite video signal. Thus, it is, but not necessary, to compensate for a damaged band of the original luminance signal to detect the edge of the original luminance signal. Accordingly, the band of the luminance signal is restored before the edge of the luminance signal is detected such that the edge of the restored luminance signal is detected.

The artifact region detecting unit 322 detects an artifact region using edge information output from the edge detecting unit 321, that is, the edges of the luminance signal and chrominance signals. The artifact region can be defined as a region obtained by removing the edge of the luminance signal from the edges of the first and second chrominance signals, which will be explained later in detail. The artifact region detecting unit 322 sets the detected artifact region as an artifact region determination map and outputs the artifact region determination map to the filtering unit 323.

The filtering unit 323 receives the artifact region determination map and filters a region of the image, defined by the artifact region determination map. In an exemplary embodiment, the filtering unit 323 uses a nonlinear bilateral filter such that information of an edge region or a detail region of the image is not damaged.

The color space converter 330 receives the luminance signal and the chrominance signals from which the artifact region is filtered by the filtering unit 323 and converts color coordinates of the signals to output RGB signals.

Figure 4:
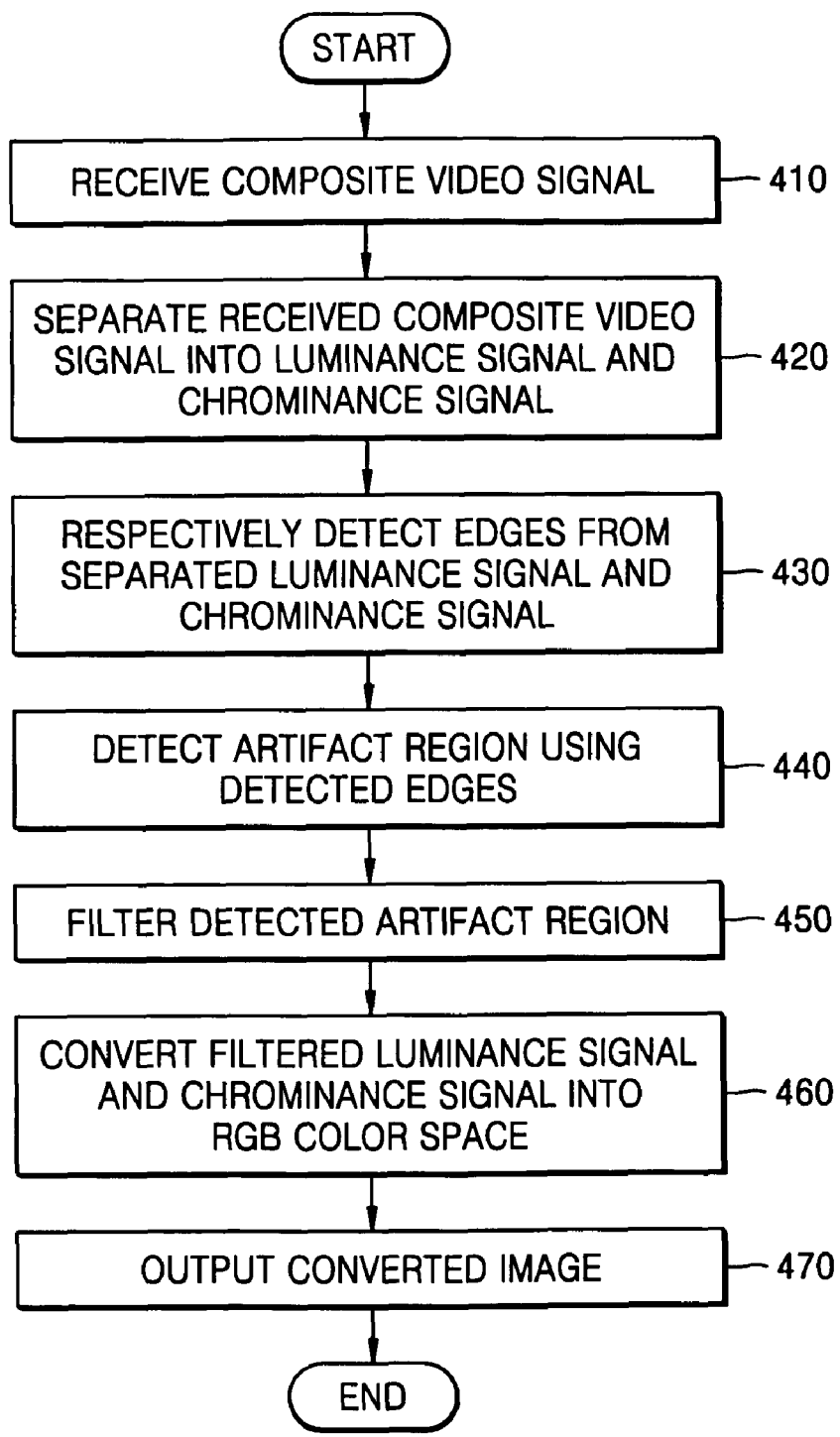
FIG. 4 is a flow chart showing the operation of the composite video signal decoder of FIG. 3.

FIG. 4 is a flow chart showing the operation of the composite video signal decoder of FIG. 3. Referring to FIGS. 3 and 4, the composite video signal decoder 300 receives a composite video signal in the operation 410. The luminance/chrominance signal separator 310 separates the received composite video signal into a luminance information signal and a chrominance information signal and outputs the luminance information signal and the chrominance information signal to the edge detecting unit 321 of the artifact removing unit 320 in the operation 420.

The edge detecting unit 321 respectively detects the edges of the luminance signal information signal and the chrominance information signal and provides the detected edges to the artifact region detecting unit 322 in the operation 430. The artifact region detecting unit 322 detects an artifact region using the detected edges of the luminance and chrominance information signals and provides information about the detected artifact region to the filtering unit 323 in the operation 440.

The filtering unit 323 filters the detected artifact region in the operation 450. The color space converter 330 receives the luminance and chrominance information signals from which the artifact region has been filtered by the filtering unit 323, converts the received signals into an RGB color space in the operation 460 and outputs a transformed image in the operation 470.

Figure 5:
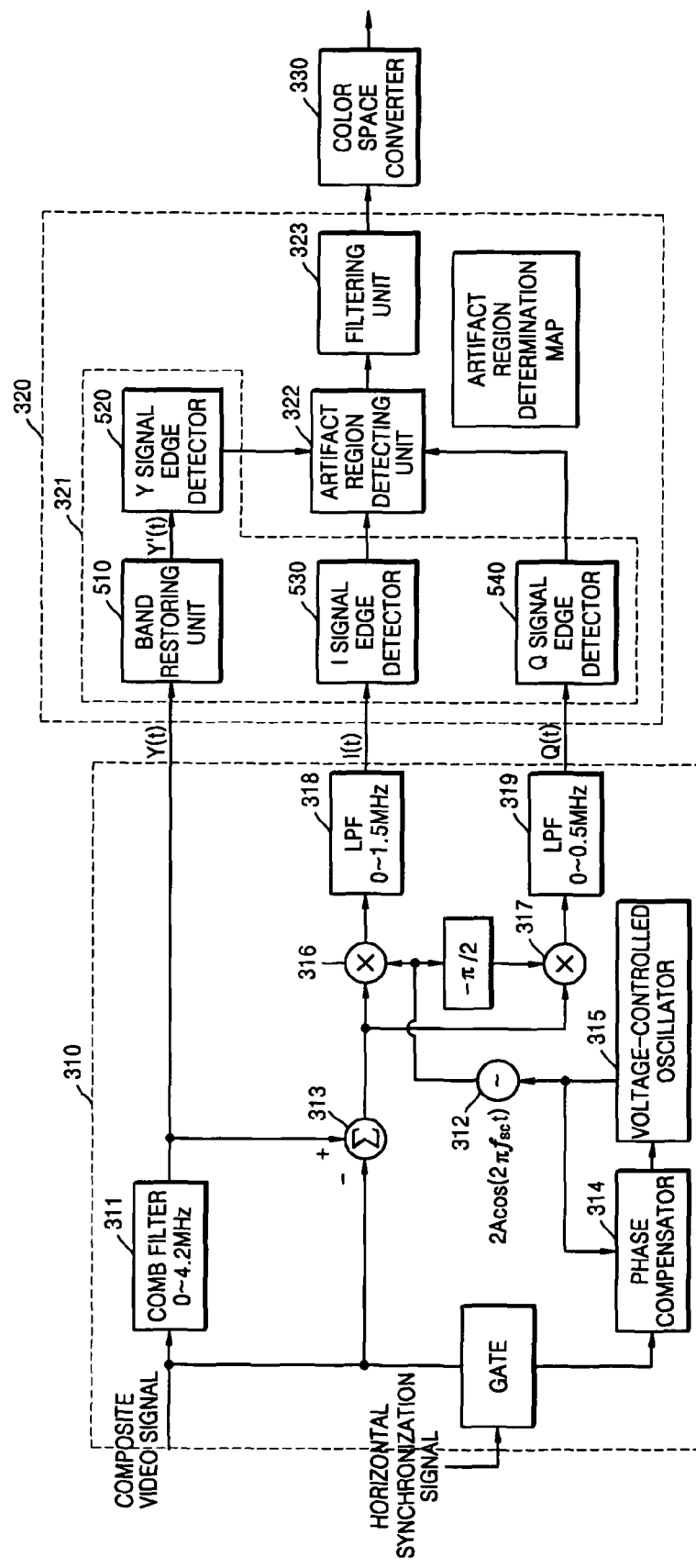
FIG. 5 is a block diagram of a composite video signal decoder according to an embodiment of the present invention.

FIG. 5 is a block diagram of a composite video signal decoder according to an embodiment of the present invention. Referring to FIG. 5, the composite video signal decoder includes a luminance/chrominance signal separator 310, an artifact removing unit 320 and a color space converter 330.

The luminance/chrominance signal separator 310 includes a comb filter 311, a gate, a summer 313, a phase compensator 314, a voltage-controlled oscillator 315, a multiplier 316, a multiplier 317, a low pass filter 318, and a low pass filter 319. The comb filter 311 filters an input composite video signal and outputs a separated luminance signal Y(t) to a band restoring unit 510. The summer 313 subtracts the composite video signal from the signal filtered by the comb filter 311 and outputs the resultant signal to the multipliers 316 and 317. The multipliers 316 and 317 multiply the signals input thereto by a phase provided by a voltage source 312 and a phase having a difference of 90° from the phase and output the resultant signals to the low pass filters 318 and 319, respectively. Here, the voltage source 312 has a color sub-carrier frequency and the decoder demodulates the chrominance signal using the color sub-carrier frequency.

In an exemplary embodiment, the low pass filter 318 passes the received signal through a band of 0 through 1.5 MHz to output a first chrominance signal I(t) to an I signal edge detector 530, and the low pass filter 319 passes the received signal through a band of 0 through 0.5 MHz to output a second chrominance signal Q(t) to an Q signal edge detector 540.

The luminance/chrominance signal separator 310 separates the input composite video signal into one luminance signal Y and the two chrominance signals I and Q. The relationship among the composite video signal, the luminance signal and the chrominance signals is as follows.

$$CVBS(t) = Y(t) + I \cos(f_{SC}t) + Q \sin(f_{SC}t)$$

The chrominance signals can be represented as follows.

$$C(t) = I \cos(f_{SC}t) + Q \sin(f_{SC}t)$$

The artifact removing unit 320 includes an edge detecting unit 321, an artifact region detecting unit 322 and a filtering unit 323. The edge detecting unit 321 includes the band restoring unit 510, an Y signal edge detector 520, the I signal edge detector 530, and the Q signal edge detector 540.

The band restoring unit 510 receives the luminance signal Y(t) output from the comb filter 311 and restores a band removed from the luminance signal by the comb filter. When an image is actually processed, non-ideal comb filtering is performed on the image and thus comb filtering degrades a region including a color sub-carrier frequency component. Accordingly, it is preferable, but not necessary, to restore a part degraded by comb filtering. A band stop filter can be used to restore the band of the luminance signal.

Figure 6A:
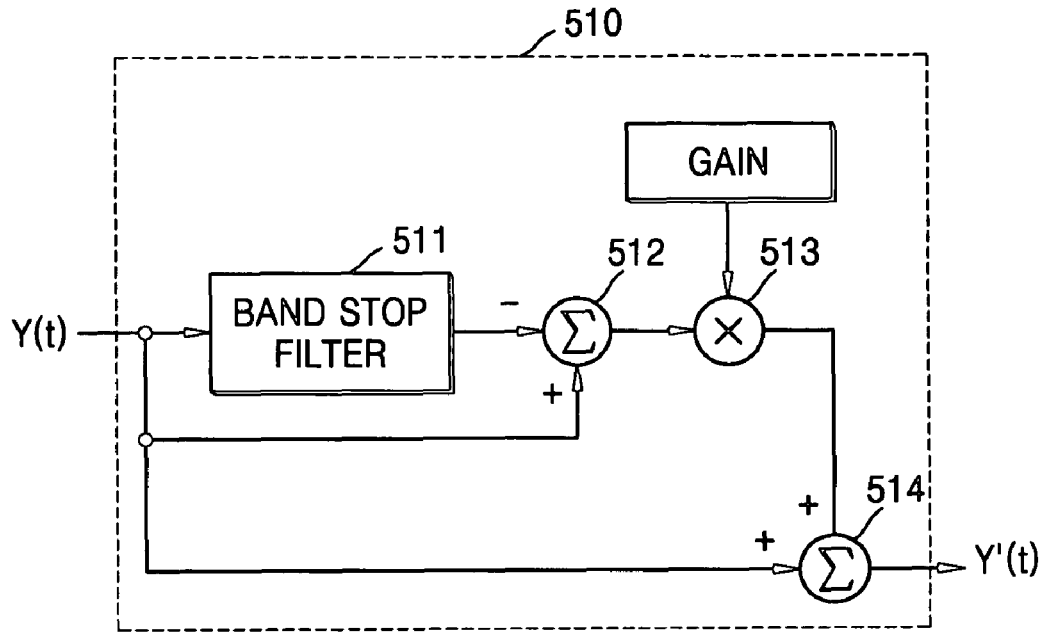
FIG. 6A illustrates the band restoring unit 510 of FIG. 5 according to an embodiment of the present invention.

FIG. 6A illustrates the band restoring unit 510 of FIG. 5 according to an embodiment of the present invention. Referring to FIG. 6A, the band restoring unit 510 includes a band stop filter 511, a summer 512, a multiplier 513 and a summer 514. The input luminance signal Y(t) passes through the band stop filter 511 to be output to the summer 512. The summer 512 subtracts the signal output from the band stop filter 511 from the input luminance signal Y(t) and outputs the subtracted signal to the multiplier 513. The multiplier 513 multiplies the signal received from the summer 512 by a predetermined gain and outputs the multiplied signal to the summer 514. The summer 514 sums up the signal multiplied by the gain and the input signal Y(t) to output a band-restored signal Y'(t). This band boost-up filter can sharpen a specific band.

Figure 6B:
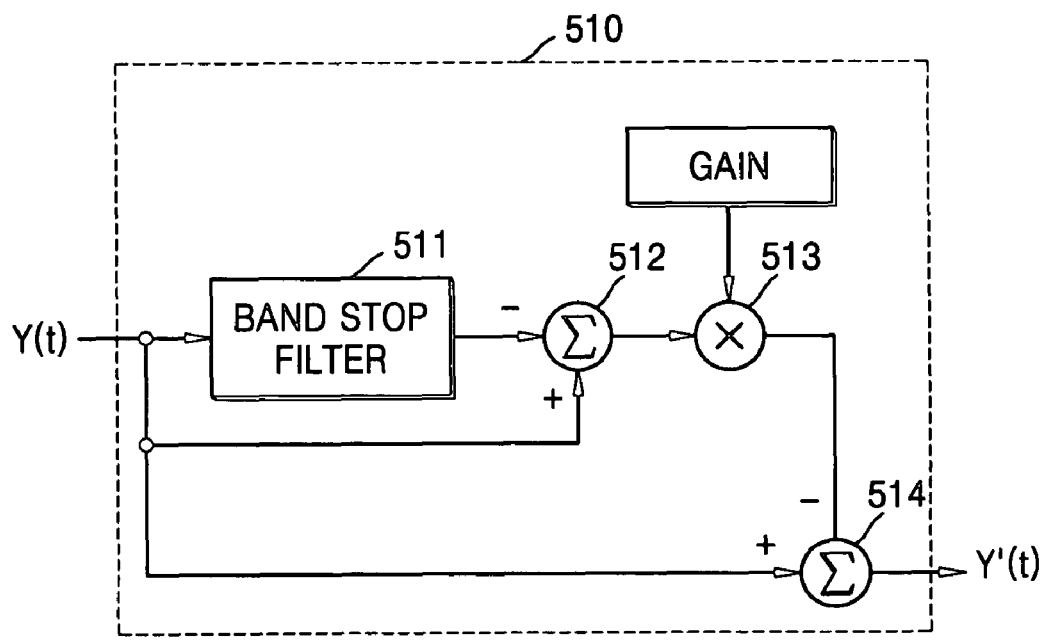
FIG. 6B illustrates the band restoring unit 510 of FIG. 5 according to another embodiment of the present invention.

FIG. 6B illustrates the band restoring unit 510 of FIG. 5 according to another embodiment of the present invention. Referring to FIG. 6B, the band restoring unit 510 includes the band stop filter 511, the summer 512, the multiplier 513 and the summer 514. Here, the summer 514 does not sums up the signal multiplied by the predetermined gain and the input signal Y(t) but subtracts the signal multiplied by the gain from the input signal Y(t) to output the band-restored signal Y'(t), thereby removing a predetermined band.

In this manner, the bandwidth of the luminance signal, assumed to be removed by the comb filter, can be restored using the band stop filter shown in FIG. 6A or 6B. Filtering according to band restoration can emphasize artifacts and form a sharper image for the luminance component in a specific band frequency.

The Y signal edge detector 520 receives the band-restored luminance signal output from the band restoring unit 510 and detects the edge of the luminance signal. The I signal edge detector 530 receives the chrominance signal I(t) output from the low pass filter 318 and detects the edge of the chrominance signal I(t). The Q signal edge detector 540 receives the chrominance signal Q(t) output from the low pass filter 319 and detects the edge of the chrominance signal Q(t).

Edge detection can be performed using the aforementioned edge detection masks. The edge detection masks include Prewitt mask, Robert mask, Sobel mask, and Canny mask in consideration of a noise of an input signal. An example of Robert mask is as follows.

$$\begin{vmatrix} 0 & -1 \\ 1 & 0 \end{vmatrix} \text{ and } \begin{vmatrix} -1 & 0 \\ 0 & 1 \end{vmatrix}$$

An example of Sobel mask is as follows.

$$\begin{vmatrix} 1 & 0 & -1 \\ 2 & 0 & -2 \\ 0 & 0 & -1 \end{vmatrix} \text{ and } \begin{vmatrix} -1 & -2 & -1 \\ 0 & 0 & 0 \\ 1 & 2 & 1 \end{vmatrix}$$

An example of Prewitt mask is as follows.

$$\begin{vmatrix} 1 & 0 & -1 \\ 1 & 0 & -1 \\ 1 & 0 & -1 \end{vmatrix} \text{ and } \begin{vmatrix} -1 & -1 & -1 \\ 0 & 0 & 0 \\ 1 & 1 & 1 \end{vmatrix}$$

The artifact region detecting unit 322 respectively receives Y signal edge information, I signal edge information and Q signal edge information from the Y signal edge detector 520, I signal edge detector 530 and Q signal edge detector 530 to detect an artifact region.

Figure 7A:
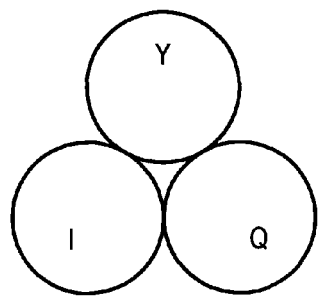
FIGS. 7A through 7F are diagrams for explaining artifact regions.

If luminance/chrominance signal separation is perfectly performed, the luminance signal and chrominance signals do not have an overlapping region because they are exclusive. That is, the luminance signal and chrominance signals have an ideal form as shown in FIG. 7A.

Figure 7B:
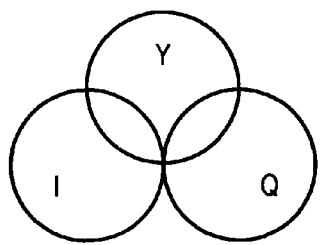
Figure 7C:
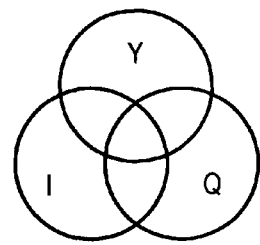
Figure 7D:
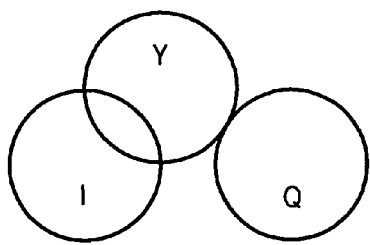
Figure 7E:
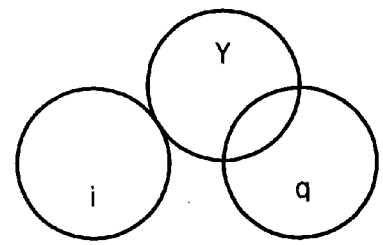
Figure 7F:
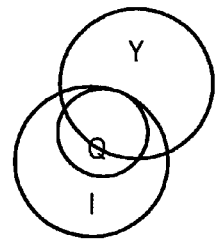

When the luminance signal and chrominance signals are not perfectly separated, an artifact is generated in the image. Overlapping of the luminance signal and chrominance signals can include harmonic peaks or a high frequency component of an edge or detailed region. Accordingly, the artifact caused by overlapping of the luminance signal and chrominance signals is generated in overlapped portions of the luminance signal and chrominance signals, as shown in FIGS. 7B through 7F. FIG. 7B illustrates overlapping of the Y and I signals and overlapping of the Y and Q signals, and FIG. 7C illustrates overlapping of the Y, I and Q signals. FIG. 7D illustrates overlapping of the Y and I signals, FIG. 7E illustrates overlapping of the Y and Q signals, and FIG. 7F shows that the Y, I and Q signals are overlapped and the I signal includes the Q signal.

When the edge information of the Y signal is $Edge_y$, the edge information of the I signal is $Edge_i$, and the edge information of the Q signal is $Edge_q$, the artifact region is defined as follows.

$$(Edge_i \cup Edge_q) - (Edge_y \cap Edge_i) - (Edge_y \cap Edge_q)$$

That is, the artifact region detecting unit 322 compares $Edge_y$, $Edge_i$ and $Edge_q$ and sets a region defined by $(Edge_i \cup Edge_q) - (Edge_y \cap Edge_i) - (Edge_y \cap Edge_q)$ as the artifact region determination map. This combination for determining the artifact region is an example and the artifact region can be detected using combinations similar to the aforementioned combination.

Figure 8A:
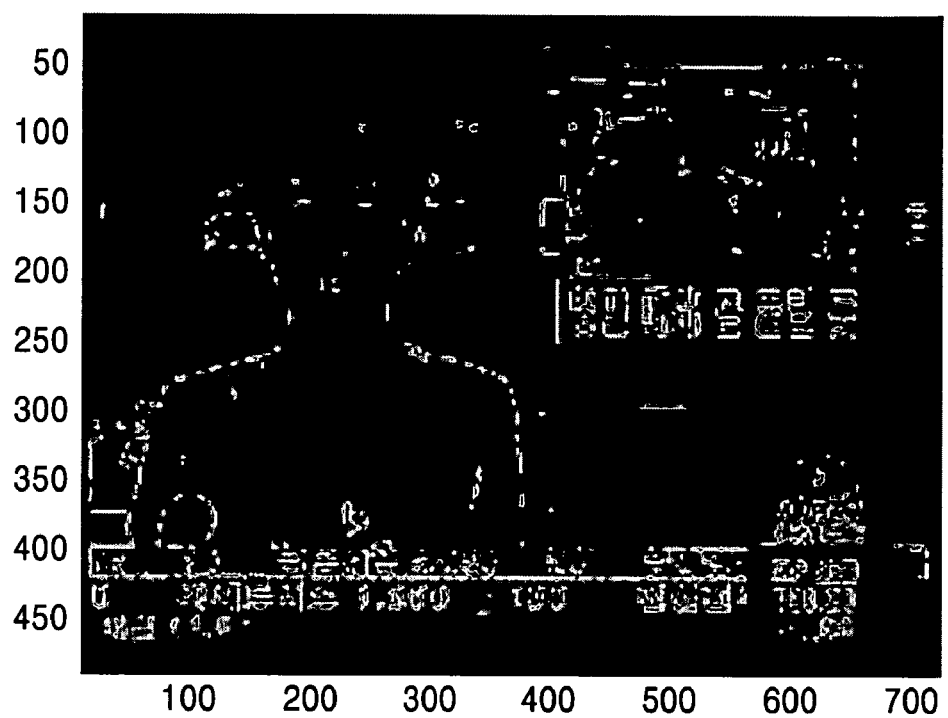
FIG. 8A shows an edge detected from an Y component of an image.
Figure 8B:
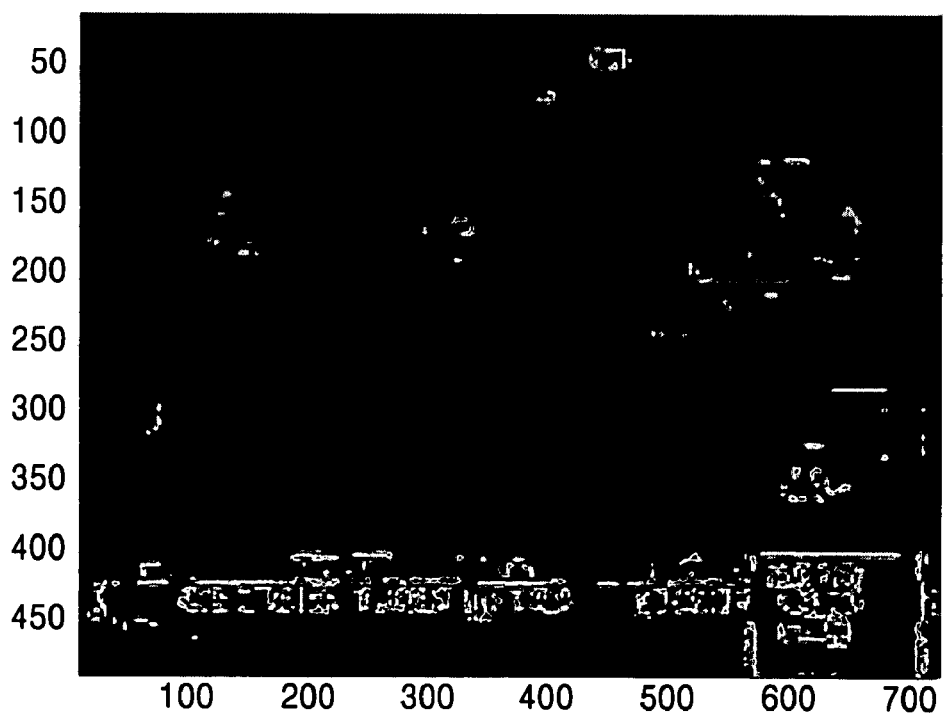
FIG. 8B shows an edge detected from an I component of the image.
Figure 8C:
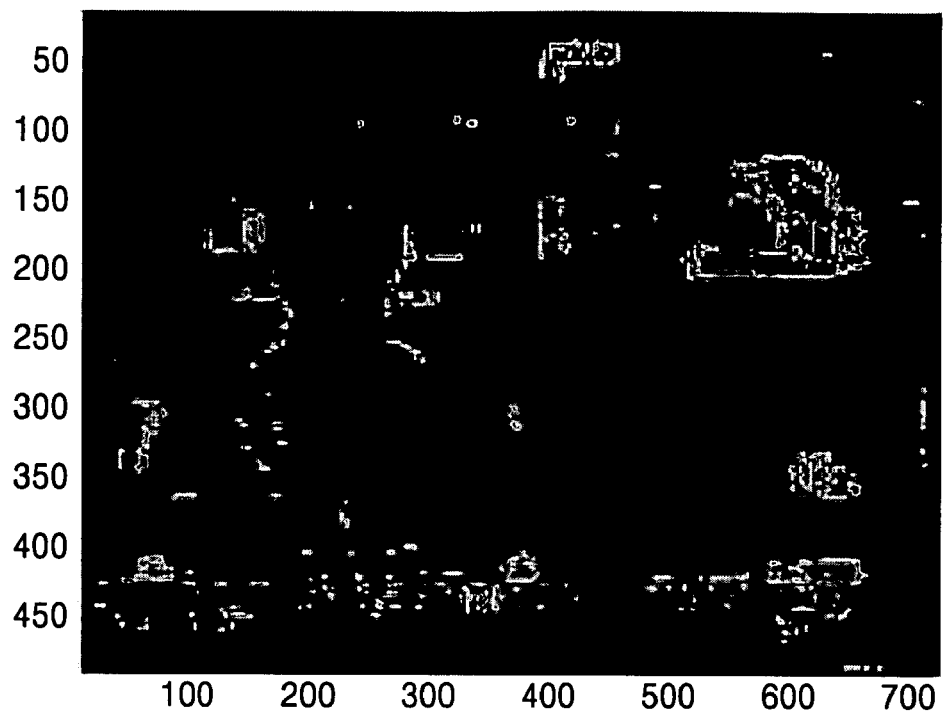
FIG. 8C shows an edge detected from a Q component of the image.
Figure 8D:
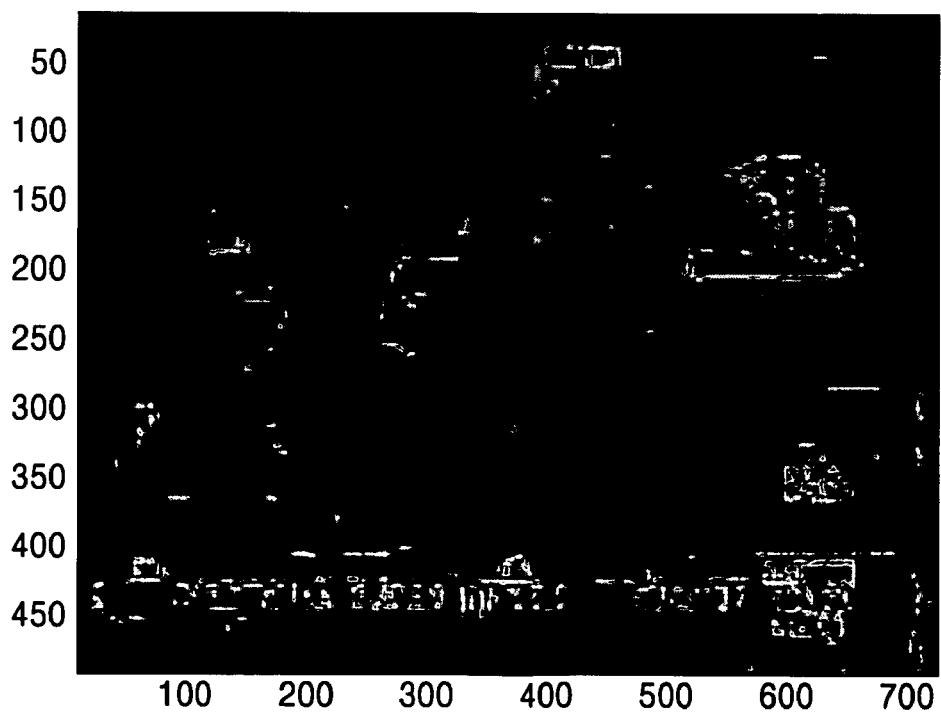
FIG. 8D shows an artifact region determination map detected using the Y component edge, the I component edge and the Q component edge of FIGS. 8A, 8B and 8C.

FIG. 8A shows an edge detected from an Y component of an image, FIG. 8B shows an edge detected from an I component of the image, and FIG. 8C shows an edge detected from a Q component of the image. The artifact region detecting unit 322 sets the artifact region determination map as shown in FIG. 8D using the Y component edge, I component edge and Q component edge, respectively shown in FIGS. 8A, 8B and 8C.

The filtering unit 323 receives the artifact region determination map from the artifact region detecting unit 322 and performs filtering on the artifact region defined by the artifact region determination map. Here, the artifact region is defined as the region obtained by subtracting the edge region of the Y signal from the edge regions of the I and Q signals, as represented by the above-described expression for determining the artifact region, and thus monochrome video signals providing no chrominance signal edge information are not filtered.

The artifact region can be filtered using a linear filter or a nonlinear filter. The nonlinear filter is preferable, but not necessary, and a bilateral filter is more preferable, but not necessary. A linear filtering algorithm based on the linear system theory may damage information of a detail region. Thus, a nonlinear filtering technique capable of preserving information of an edge and a detail region and effectively reducing a noise is preferable, but not necessary.

Nonlinear bilateral filtering smoothens an image while preserving edges according to a nonlinear combination of neighboring image values. This nonlinear bilateral filtering combines gray levels or colors based on geometrical vicinity and similarity of luminous intensity characteristics and selects values close to a domain and a range to values distant from the domain and range. Domain filtering is a conventional filtering method and range filtering is nonlinear because the weight of range filtering depends on image intensity or colors. A nonlinear bilateral filter can be considered as a combination of a range filter and a domain filter.

$$Y = X + V$$

Here, Y represents an image including an artifact, X denotes the original image, and V is the artifact. The bilateral filter restores the image X using the weighted average of pixels of the image Y. The image X to be restored can be represented as follows.

$$\hat{x}[k] = \frac{\sum_{n=-N}^{N} w[k,n]y[k-n]}{\sum_{n=-N}^{N} w[k,n]}$$

Here, $w[k,n]=w_S[k,n] \cdot w_R[k,n]$, y[k] is an input video signal, and $\hat{x}[k]$ is a filtered output video signal. Furthermore, weights $w_S[k,n]$ and $w_R[k,n]$ can be represented as follows.

$$w_S[k,n] = e^{\frac{d^2\{[k],[k-n]\}}{2\sigma_S^2}} = e^{\frac{n^2}{2\sigma_S^2}}$$

$$w_R[k,n] = e^{\frac{d^2\{[k],y[k-n]\}}{2\sigma_R^2}} = e^{\frac{[y[k]-y[k-n]]^2}{2\sigma_R^2}}$$

As described above, only the artifact region of the image can be effectively removed without damaging the edge or detailed region of the image by filtering only the artifact region using the nonlinear bilateral filter.

Figure 9A:
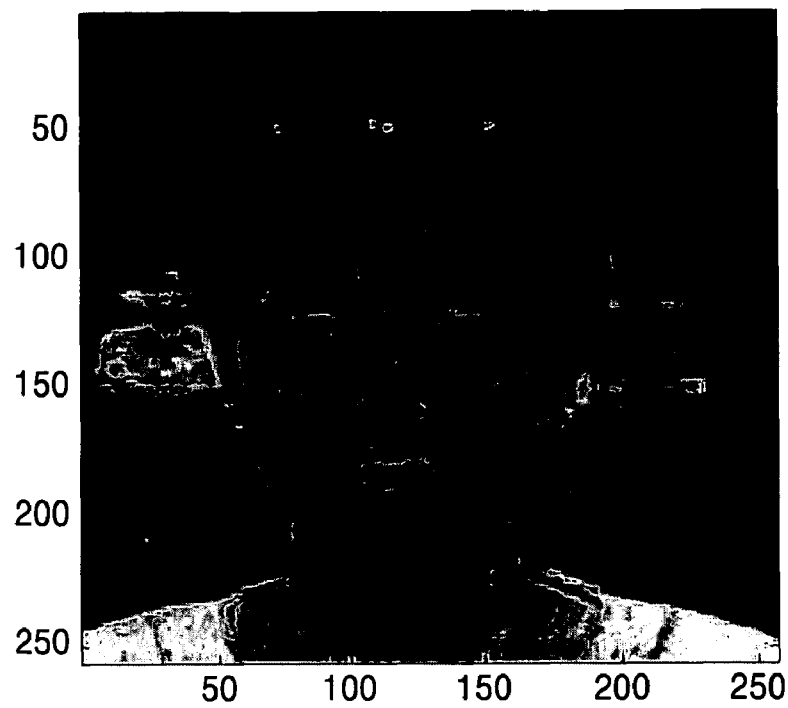
FIGS. 9A, 9B, 9C show images processed using filters other than a nonlinear bilateral filter.
Figure 9B:
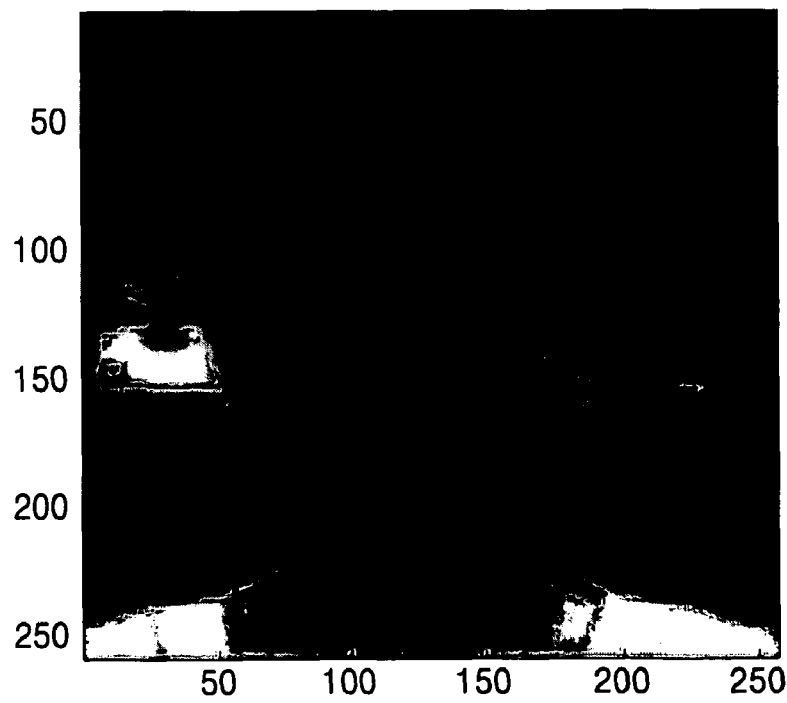
Figure 9C:
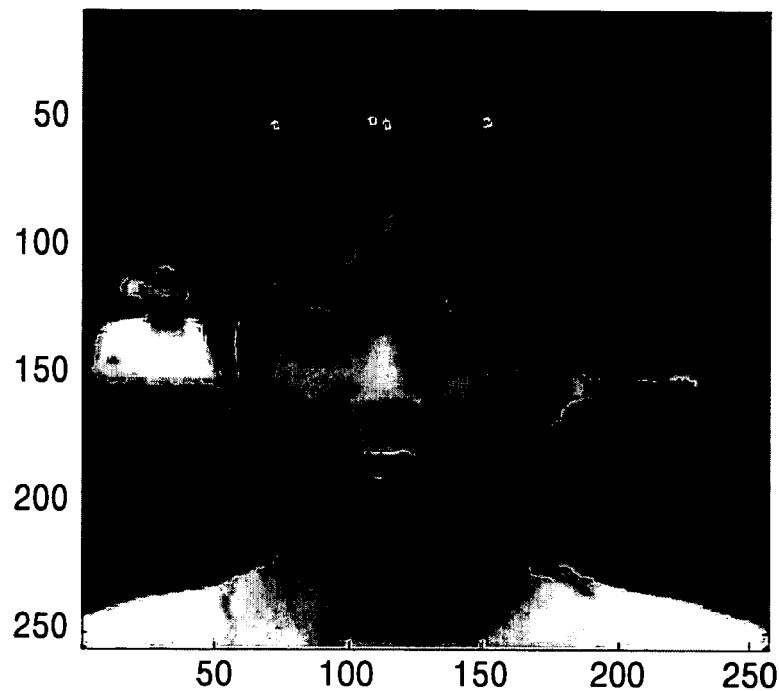
Figure 9D:
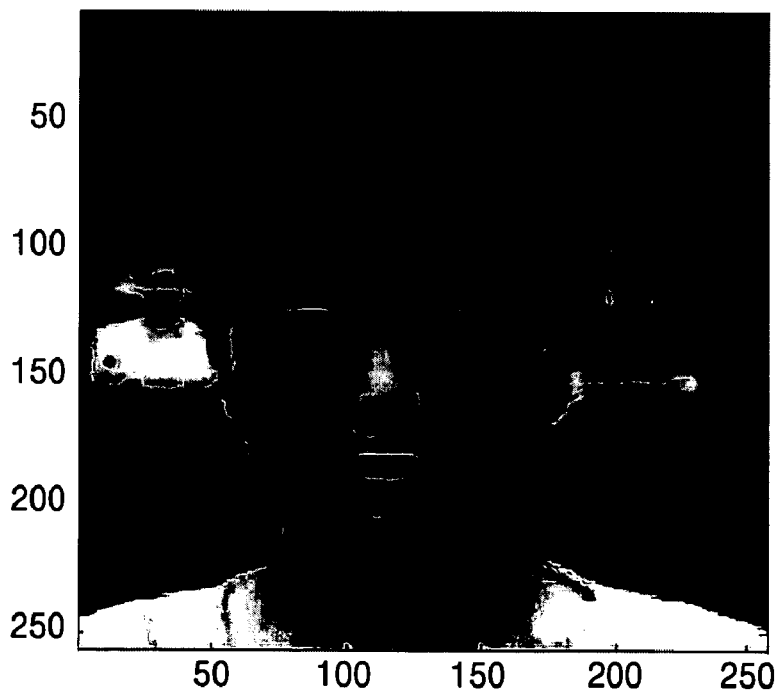
FIG. 9D shows an image processed using the nonlinear bilateral filter.

FIGS. 9A, 9B, 9C and 9D show the effect of the nonlinear bilateral filtering performed on an image. FIG. 9A shows an image having white Gaussian noise, and FIG. 9B shows an image obtained by averaging the image of FIG. 9A and low-pass-filtering (mask size, 5×5) the averaged image. FIG. 9C shows an image obtained by median-filtering the image of FIG. 9A, and FIG. 9D is an image obtained by nonlinear-bilateral-filtering the image of FIG. 9A. It can be known that nonlinear-bilateral-filtering has the most effective performance.

Figure 10:
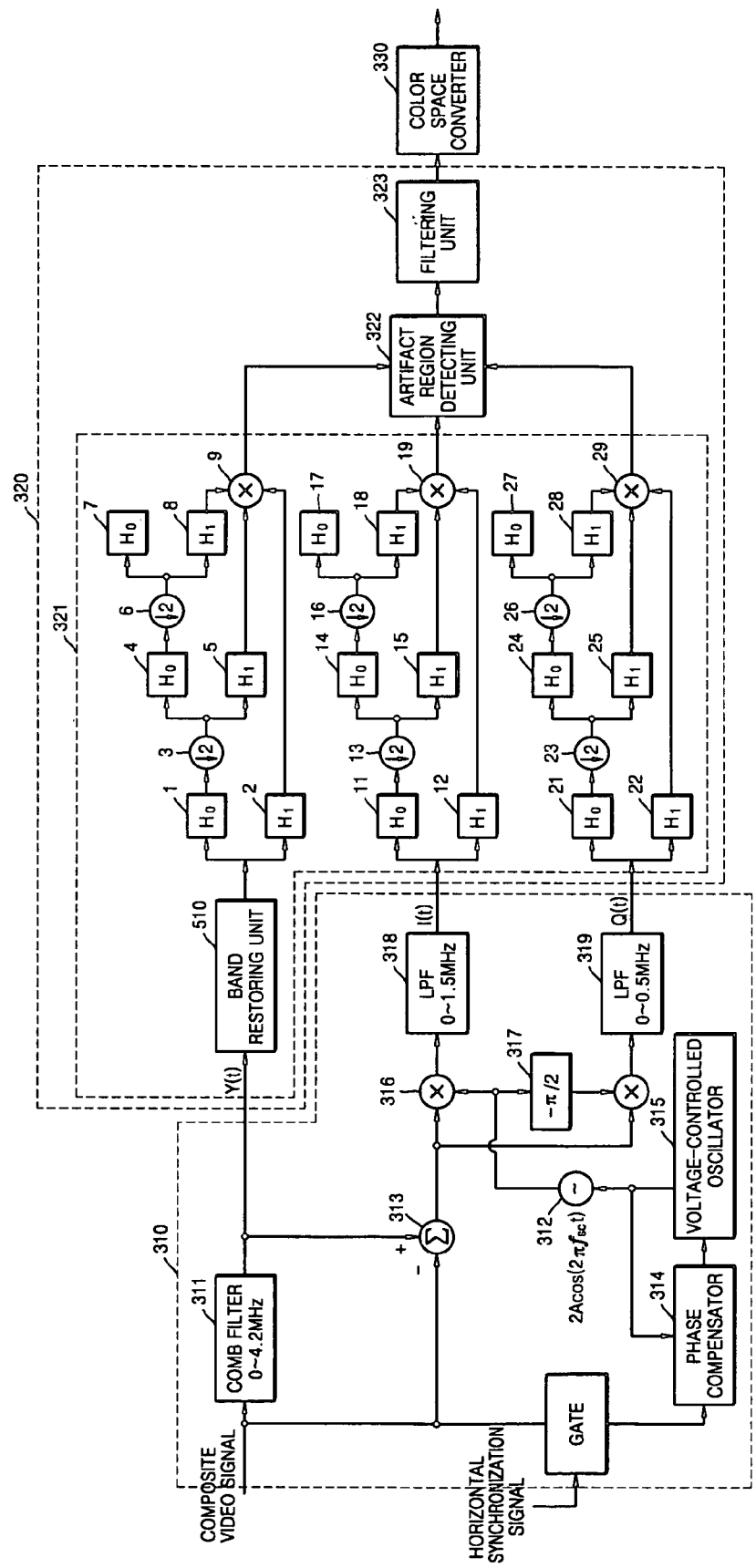
FIG. 10 is a block diagram of a composite video signal decoder according to another embodiment of the present invention.

FIG. 10 is a block diagram of a composite video signal decoder according to another embodiment of the present invention. The composite video signal decoder of FIG. 10 is similar to the composite video signal decoder of FIG. 5, except the configuration of the edge detecting unit 321. While the composite video signal decoder shown in FIG. 5 uses the mask method for edge detection, the composite video signal decoder of FIG. 10 uses a wavelet method for edge detection. Accordingly, only the edge detecting unit 321 will now be explained.

The edge detecting unit 321 includes the band restoring unit 510 and a filter bank composed of a plurality of low pass filters and high pass filters. The band-restored luminance signal output from the band restoring unit 510 respectively passes through a low pass filter 1 and a high pass filter 2. The signal that has passed through the low pass filter 1 is down-sampled twice by a 2× down-sampler 3. The down-sampled signal respectively passes through a low pass filter 4 and a high pass filter 5. The signal that has passed through the low pass filter 4 is down-sampled twice by a 2× down-sampler 6, and then respectively passes through a low pass filter 7 and a high pass filter 8. The signals respectively output from the high pass filters 2, 5 and 8 are multiplied by a multiplier 9 to be output as edge information of the Y signal.

The I signal output from the low pass filter 318 respectively passes through a low pass filter 11 and a high pass filter 12. The signal that has passed through the low pass filter 11 is down-sampled twice by a 2× down-sampler 13, and then respectively passes through a low pass filter 14 and a high pass filter 15. The signal that has passed through the low pass filter 14 is down-sampled twice by a 2× down-sampler 16, and then respectively passes through a low pass filter 17 and a high pass filter 18. The signals respectively output from the high pass filters 12, 15 and 18 are multiplied by a multiplier 19 to be output as edge information of the I signal.

The Q signal output from the low pass filter 319 respectively passes through a low pass filter 21 and a high pass filter 22. The signal that has passed through the low pass filter 21 is down-sampled twice by a 2× down-sampler 23, and then respectively passes through a low pass filter 24 and a high pass filter 25. The signal that has passed through the low pass filter 24 is down-sampled twice by a 2× down-sampler 26, and then respectively passes through a low pass filter 27 and a high pass filter 28. The signals respectively output from the high pass filters 22, 25 and 28 are multiplied by a multiplier 29 to be output as edge information of the Q signal.

As described above, the present invention detects an artifact region using the edge of the luminance signal of the composite video signal and the edge of the chrominance signal and filters only the artifact region using the nonlinear bilateral filter. Accordingly, the artifact can be effectively removed while preserving edge information and detail information of an image to improve picture quality.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method for improving the quality of a composite video signal comprising:
   respectively detecting a first edge from a luminance information signal, a second edge from a first chrominance information signal, and a third edge from a second chrominance information signal;
   detecting an artifact region using the first, the second and the third edges;
   said artifact region being obtained by removing the first edge of the luminance information signal from the second edge of the first chrominance information signal and the third edge of the second chrominance information signal; and
   filtering the artifact region.

2. The method of claim 1, wherein the respectively detecting the first and the second edges comprises:
   restoring a predetermined band into the luminance information signal to generate a restored luminance information signal; and
   detecting the first edge from the restored luminance information signal.

3. The method of claim 2, wherein the restoring the predetermined band into the luminance information signal comprises increasing or decreasing the predetermined band using a band stop filter.

4. The method of claim 1, wherein the respectively detecting the first, the second, and the third edges comprises detecting the first, the second, and the third edges using a mask method or a wavelet method.

5. The method of claim 1, wherein the detecting the artifact region comprises determining the artifact region according to $$(Edge_i \cup Edge_q) - (Edge_y \cap Edge_i) - (Edge_y \cap Edge_q)$$

where $Edge_y$ represents the first edge of the luminance information signal, $Edge_i$ represents the second edge of the first chrominance information signal, and $Edge_q$ denotes the third edge of the second chrominance information signal.

6. The method of claim 1, wherein the filtering the artifact region comprises passing the artifact region through a nonlinear bilateral filter.

7. An apparatus for improving the quality of a composite video signal comprising:
   an edge detecting unit respectively detecting a first edge from a luminance information signal, a second edge from a first chrominance information signal, and a third edge from a second chrominance information signal;
   an artifact region detecting unit detecting an artifact region using the first, and the second and the third edges;
   a filtering unit filtering the artifact region,
   wherein said artifact region is obtained by removing the first edge of the luminance information signal from the second edge of the first chrominance information signal and the third edge of the second chrominance information signal.

8. The apparatus of claim 7, wherein the edge detecting unit comprises a band restoring unit restoring a predetermined band into the luminance information signal to generate a restored luminance information signal, and a luminance information signal edge detector detecting the first edge from the restored luminance information signal.

9. The apparatus of claim 8, wherein the band restoring unit increases or decreases the predetermined band using a band stop filter.

10. The apparatus of claim 7, wherein the edge detecting unit detects the first, the second and the third edges using a mask method or a wavelet method.

11. The apparatus of claim 7, wherein the artifact region detecting unit determines the artifact region according to $$(Edge_i \cup Edge_q) - (Edge_y \cap Edge_i) - (Edge_y \cap Edge_q)$$

where $Edge_y$ represents the first edge of the luminance information signal, $Edge_i$ represents the second edge of the first chrominance information signal, and $Edge_q$ denotes the third edge of the second chrominance information signal.

12. The apparatus of claim 7, wherein the filtering unit comprises a nonlinear bilateral filter.

13. A method for decoding a composite video signal comprising:
   separating an input composite video signal into a luminance information signal, a first chrominance information signal, and a second chrominance information signal;
   respectively detecting a first edge from the luminance information signal, a second edge from the first chrominance information signal, and a third edge from the second chrominance information signal;
   detecting an artifact region using the first, the second, and the third edges;
   filtering the artifact region from the luminance information signal, the first chrominance information signal and the second chrominance information signal to generate a filtered luminance information signal and a filtered chrominance information signal; and
   converting the filtered luminance information signal and the filtered chrominance information signal into an RGB color space,
   wherein said artifact region is obtained by removing the first edge of the luminance information signal from the second edge of the first chrominance information signal and the third edge of the second chrominance information signal.

14. The decoding method of claim 13, wherein the separating the input composite video signal comprises separating the input composite video signal into the luminance information signal, the first chrominance information signal and the second chrominance information signal using a comb filter.

15. The decoding method of claim 14, wherein the detecting the first, the second and the third edges comprises:
   restoring a band removed by the comb filter from an original luminance information signal to generate a restored luminance information signal and detecting the first edge from the restored luminance information signal;
   detecting the second edge of the first chrominance information signal; and
   detecting the third edge of the second chrominance information signal.

16. The decoding method of claim 15, wherein the detecting the artifact region comprises setting a region according to $(Edge_i \cup Edge_q) - (Edge_y \cap Edge_i) - (Edge_y \cap Edge_q)$ as an artifact region determination map
   where $Edge_y$ represents the first edge of the luminance information signal, $Edge_i$ represents the second edge of the first chrominance information signal, and $Edge_q$ denotes the third edge of the second chrominance information signal.

17. The decoding method of claim 16, wherein the filtering the artifact region comprises passing the region defined by the artifact region determination map through a nonlinear bilateral filter.

18. An apparatus for decoding a composite video signal comprising:
   a luminance and chrominance signal separating unit separating an input composite video signal into a luminance information signal, a first chrominance information signal, and a second chrominance information signal;
   an edge detecting unit respectively detecting a first edge from the luminance information signal, a second edge from the first chrominance information signal, and a third edge from the second chrominance information signal;
   an artifact region detecting unit detecting an artifact region using the first, the second and the third edges;
   a filtering unit filtering the artifact region from the luminance information signal and the first chrominance information signal, and the second chrominance information signal to generate a filtered luminance information signal and a filtered chrominance information signal; and
   a color space converting unit converting the filtered luminance information signal and the filtered chrominance information signal into an RGB color space,
   wherein said artifact region is obtained by removing the first edge of the luminance information signal from the second edge of the first chrominance information signal and the third edge of the second chrominance information signal.

19. The decoding apparatus of claim 18, wherein the luminance and chrominance signal separating unit comprises a comb filter separating the composite video signal into the luminance information signal, the first chrominance information signal and the second chrominance information signal.

20. The decoding apparatus of claim 19, wherein the edge detecting unit comprises:
   a band restoring unit restoring a band removed by the comb filter from an original luminance information signal that has passed through the comb filter to generate a restored luminance information signal;
   a luminance information signal edge detecting unit detecting the first edge from the restored luminance information signal;

a first chrominance information signal edge detecting unit detecting the second edge of the first chrominance information signal; and a second chrominance information signal edge detecting unit detecting the third edge of the second chrominance information signal.

21. The decoding apparatus of claim 20, wherein the artifact region detecting unit sets a region according to $(Edge_i \cup Edge_q) - (Edge_y \cap Edge_i) - (Edge_y \cap Edge_q)$ as an artifact region determination map where $Edge_y$ represents the first edge of the luminance information signal, $Edge_i$ represents the second edge of the first chrominance information signal, and $Edge_q$ denotes the third edge of the second chrominance information signal.

22. The decoding apparatus of claim 21, wherein the filtering unit comprises a nonlinear bilateral filter filtering the region defined by the artifact region determination map.

* * * * *